Patented Dec. 5, 1933

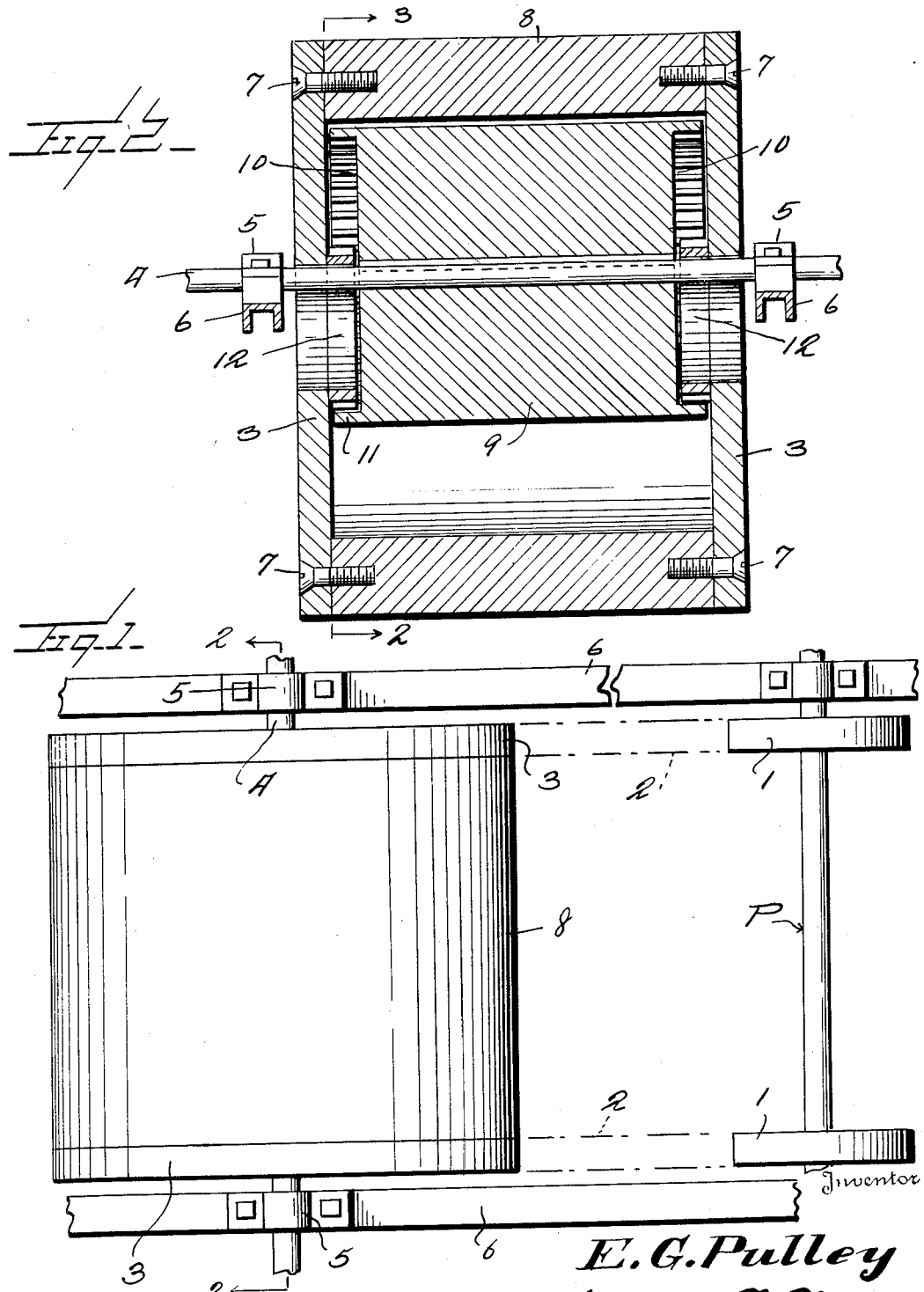

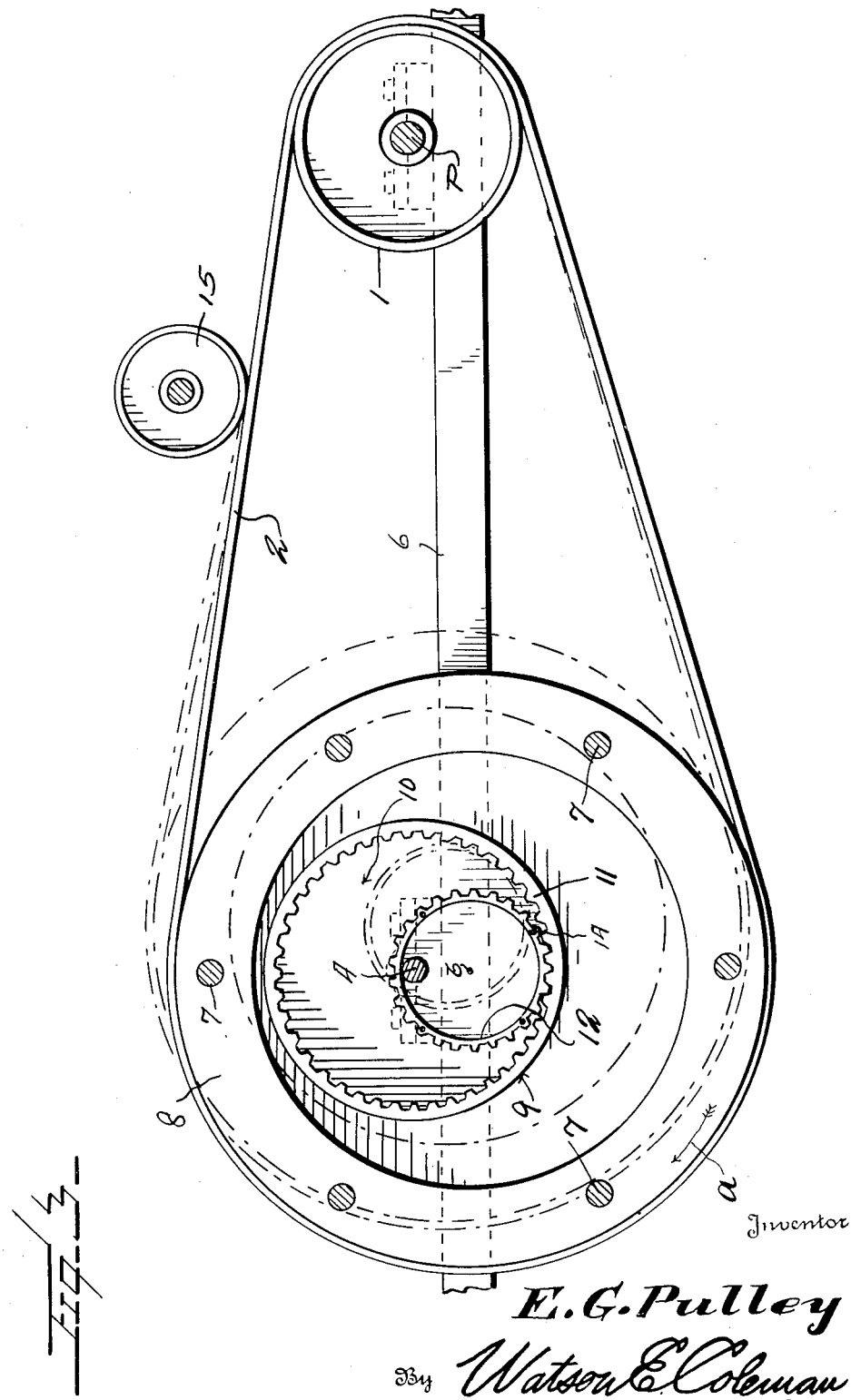

1,938,152

UNITED STATES PATENT OFFICE 1,938,152

FLYWHEEL

Edward G. Pulley, Marion, Ill.

Application November 15, 1932
Serial No. 642,776

2 Claims. (Cl. 74—219)

This invention relates to a fly wheel mechanism, and it is an object of the invention to provide a device of this kind adapted to be used in connection with a prime mover or source of power whereby the fly wheel mechanism serves as an auxiliary to the prime mover or source of power to materially facilitate the effectiveness of such power and more especially in the producing of pulsating power.

Another object of the invention is to provide a device of this kind which comprises in its construction a cylindrical weighted mass whereby the effectiveness of the machine is accomplished through the shifting of the weight of this weighted member.

The invention consists in the details of construction and in the combination and arrangement of the several parts of my improved fly wheel mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a fly wheel mechanism constructed in accordance with an embodiment of my invention;

Figure 2 is a sectional view taken substantially on the line 2—2 of Figure 1;

Figure 3 is a sectional view taken substantially one the line 3—3 of Figure 2.

As illustrated in the accompanying drawings, P denotes a prime mover which is herein disclosed as a shaft which may be driven in a conventional manner from any suitable type of motor. This shaft has fixed thereto at points spaced thereon pulleys 1 with each of which engages a belt 2. Each of the belts 2 is engaged with the periphery of a circular plate 3 through which is freely directed a power take-off shaft 4. This shaft 4 is supported by the bearings 5 upon a suitable chassis or supporting structure 6 as is also the shaft P as herein set forth and the portions of the shaft 4 inwardly of the bearings 5 are freely directed through the relatively large circular openings 3' of the plates 3. These openings 3' are arranged at substantially the center of the plates.

The plates 3 are bolted, as at 7, to an annular member 8 of lead or other extremely heavy material and, as is particularly illustrated in Figures 2 and 3, it is to be noted that the shaft 4 is eccentric to the axial center of the member 8 so that said member 8 to one side of the shaft 4 is heavier than at the opposite side. This arrangement or mounting of the member 8 results in the production of the desired gravital action whereby my improved fly wheel mechanism operates to facilitate and accelerate the effective working action of the prime mover P and more especially in the production of pulsating power.

Rotating with the shaft 4 is a solid drum 9 which substantially bridges the space between the plates 3 and the periphery of this drum 9 is concentric to the shaft 4. The opposite end portions of the drum 9 are recessed, as at 10, to provide the internally toothed annular flanges 11 which mesh with the externally toothed annular gears 12 fixed to the end plates 3 in any desired manner, as indicated at 14. These gears 12 are concentric to the axes of the openings 3' in the plates 3 and the inner face of each of the gears 12 is flush with the defining wall of the adjacent opening 3'. The gears 12, however, serve to position the shaft 4 eccentric to the axial center of the member 8.

Upon operation of the prime mover P the member 8 will be caused to turn and after the high point thereof has passed above and beyond the vertical center the additional weight at such side of the shaft will increase the continued rotation of the member 8 and thus making more effective the desired rotation of the shaft 4.

With the member 8 rotating in the direction of the arrow $a$ the gears 12 will have a tendency to rotate forwardly and upwardly with respect to the gears 11 whereby the major portion of the weight of the member 8 will be to one side of the vertical center of the shaft 4 and thus accelerating the action of the shaft 4. In Figure 3 of the drawings, the device is illustrated in full lines as at rest while the effective position of the member 8 is indicated by broken lines.

The gears 12 coact with the gears 11 to hold the shaft 4 eccentric to the axial center of the member 8 and it is to be further stated that the tendency of the member 8 under the action of the prime mover is to rotate about its axis $b$.

As the weight or member 8 rotates there will be a tendency of the belts 2 to intermittently slacken or tighten as a result of the eccentric travel of the weight or member 8. A conventional tension roller 15, as illustrated in Figure 3, may be readily employed in connection with the upper stretch of each of the belts 2 to maintain said belt taut at all times.

From the foregoing description it is thought to be obvious that a fly wheel mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A fly wheel mechanism comprising a power take-off shaft, a hollow weight eccentrically mounted on said shaft, a member concentrically mounted on the shaft and positioned within the hollow weight, gear wheels secured for rotation with the hollow weight about axes eccentric to the shaft, and internal gears carried by the concentric member with which the eccentric gears mesh, and means for imparting rotary movement to the weight.

2. A fly wheel mechanism comprising a power take-off shaft, a hollow weight eccentrically mounted on said shaft, a member concentrically mounted on the shaft and positioned within the hollow weight, gear wheels secured for rotation with the hollow weight about axes eccentric to the shaft, internal gears carried by the concentric member with which the eccentric gears mesh, means for imparting rotary movement to the weight, the ends of the weight comprising detachable plates, the gear wheels being carried by said plates, and means for securing the detachable plates into position.

EDWARD G. PULLEY.